May 10, 1966  W. L. ROOT, 3RD  3,250,321
ROTARY BATCH PROCESSOR

Filed July 9, 1964  5 Sheets-Sheet 1

INVENTOR:
WILLIAM L. ROOT, 3rd
BY
Howson & Howson
ATTYS.

INVENTOR:
WILLIAM L. ROOT, 3rd.

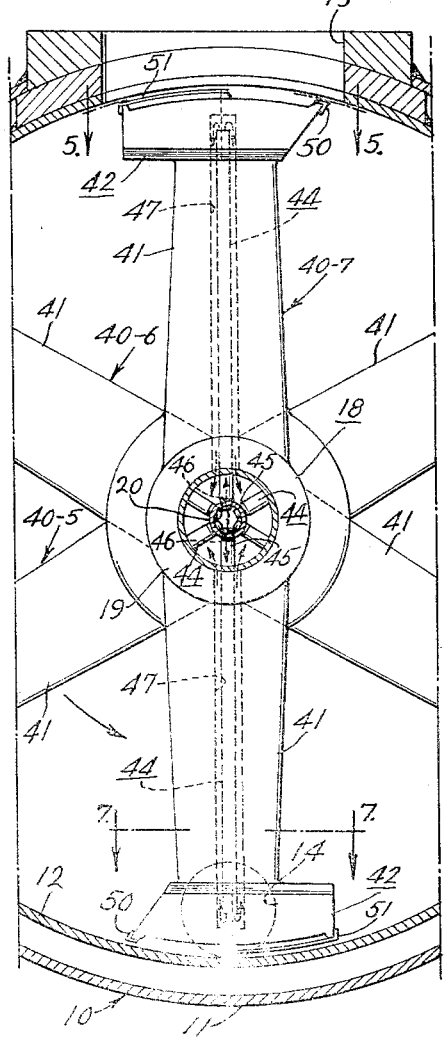
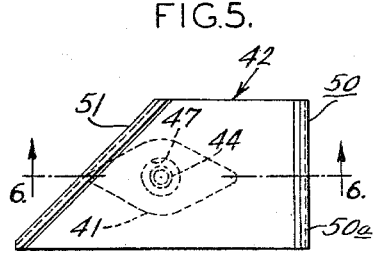
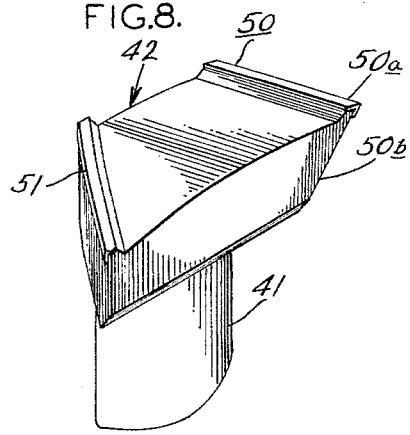
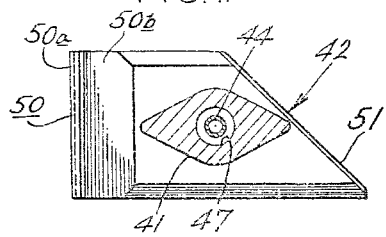
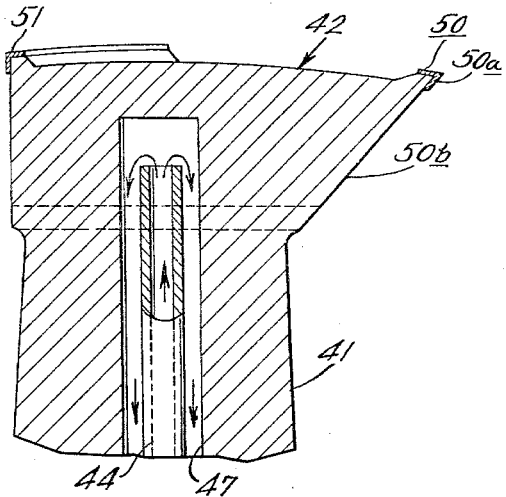

May 10, 1966  W. L. ROOT, 3RD  3,250,321
ROTARY BATCH PROCESSOR

Filed July 9, 1964  5 Sheets-Sheet 4

INVENTOR:
WILLIAM L. ROOT, 3rd
BY
Howson & Howson
ATTYS.

May 10, 1966  W. L. ROOT, 3RD  3,250,321
ROTARY BATCH PROCESSOR
Filed July 9, 1964  5 Sheets-Sheet 5

INVENTOR:
WILLIAM L. ROOT, 3rd.
BY
Howson & Howson
ATTYS.

United States Patent Office 3,250,321
Patented May 10, 1966

3,250,321
ROTARY BATCH PROCESSOR
William L. Root 3rd, Bethlehem, Pa., assignor to The Bethlehem Corporation, Bethlehem, Pa., a corporation of Pennsylvania
Filed July 9, 1964, Ser. No. 381,425
17 Claims. (Cl. 165—94)

The present invention relates to mixing apparatus and more particularly to rotary mixing apparatus wherein heat is to be indirectly transferred either to or from, as the case may be, the material to be processed.

Although rotary mixing apparatus is old in the art, in recent years there has been a trend to incorporate within the mixing apparatus, heat exchange means whereby heat may be added or removed from the material as it is being mixed. In certain apparatus, notably continuous processing rotary mixers such as that disclosed in my copending application S.N. 381,475 filed concurrently herewith, material to be processed is inserted at one end of the apparatus, and as the mixing process takes place the material is conveyed to the discharge end of the apparatus. In this type apparatus, the mixing unit is incorporated within the conveying unit, the apparatus being of sufficient length to allow materials to be treated and mixed as they are being conveyed from the inlet to the outlet of the apparatus. However, if the mixing which must take place requires a length of time non-proportional to the length of the apparatus and the rate of the material being conveyed between the inlet and outlet of the apparatus, it is necessary to either operate in series these continuous heat-exchanger-mixers or provide batch-type mixing apparatus. The present invention is directed toward the latter type apparatus.

In view of the above, it is an object of the present invention to provide a batch-type rotary mixing apparatus wherein heat may be indirectly transferred either to or from the processed material, but which apparatus will be easily adaptable to any kind of material to be mixed and treated.

Another object of the present invention is to provide apparatus which may be used in the processes of calcination, chilling, cooking, crystallization, indirect drying, heating, reactions and solvent recovery.

Still another object of the present invention is to provide apparatus capable of mixing and treating liquids, slurries, paste materials and/or solids.

Another object of the present invention is to provide apparatus which permits the heat transfer portions of the apparatus to be maintained at the same temperature regardless of their position in the device, thus permitting a greater mean-temperature-difference between the material being treated and the heat transfer portions of the mixing apparatus.

Another object of the present invention is to provide a mixing heat-exchanger wherein optimum mixing occurs upon rotation of the mixing apparatus in one direction, and discharge of the material is incurred by rotation of the apparatus in the opposite direction.

Another object of the present invention is to provide heat-exchanger mixing apparatus which, while mixing, provides an efficient, indirect exchange of heat between the material and the apparatus.

Other objects and a fuller understanding of the invention may be had by referring to the following description and claims taken in conjunction with the accompanying drawings in which:

FIG. 4 is an enlarged fragmentary sectional view taken along line 4—4 of FIG. 2;

FIG. 5 is a plan view of a portion of the apparatus shown in FIG. 4 and as viewed along line 5—5 of FIG. 4;

FIG. 6 is an enlarged fragmentary sectional view taken along line 6—6 of FIG. 5;

FIG. 7 is a sectional view taken along line 7—7 of FIG. 4;

FIG. 8 is a perspective view of a portion of the apparatus illustrated in FIG. 4;

Figure 1:
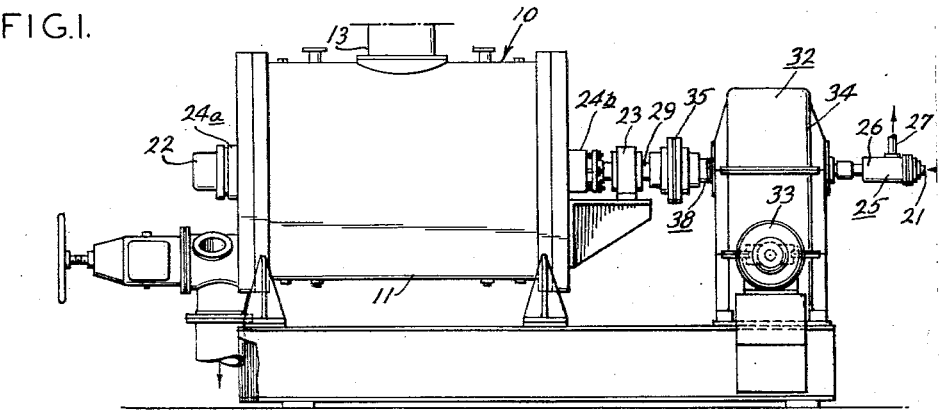
FIG. 1 is a schematic profile of apparatus embodying the present invention.
Figure 3:
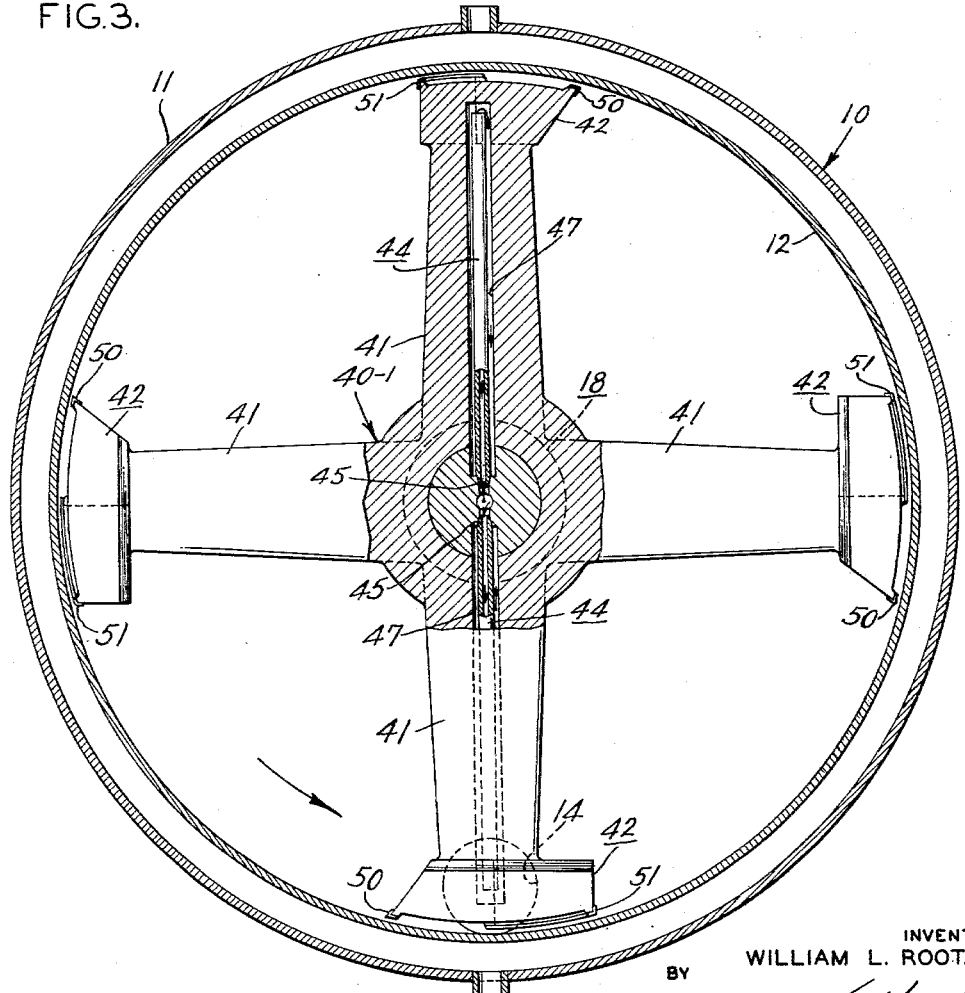
FIG. 3 is an enlarged sectional view taken along line 3—3 of FIG. 2 with a portion of the apparatus broken away to more clearly illustrate the interior of the apparatus.
Figure 2:
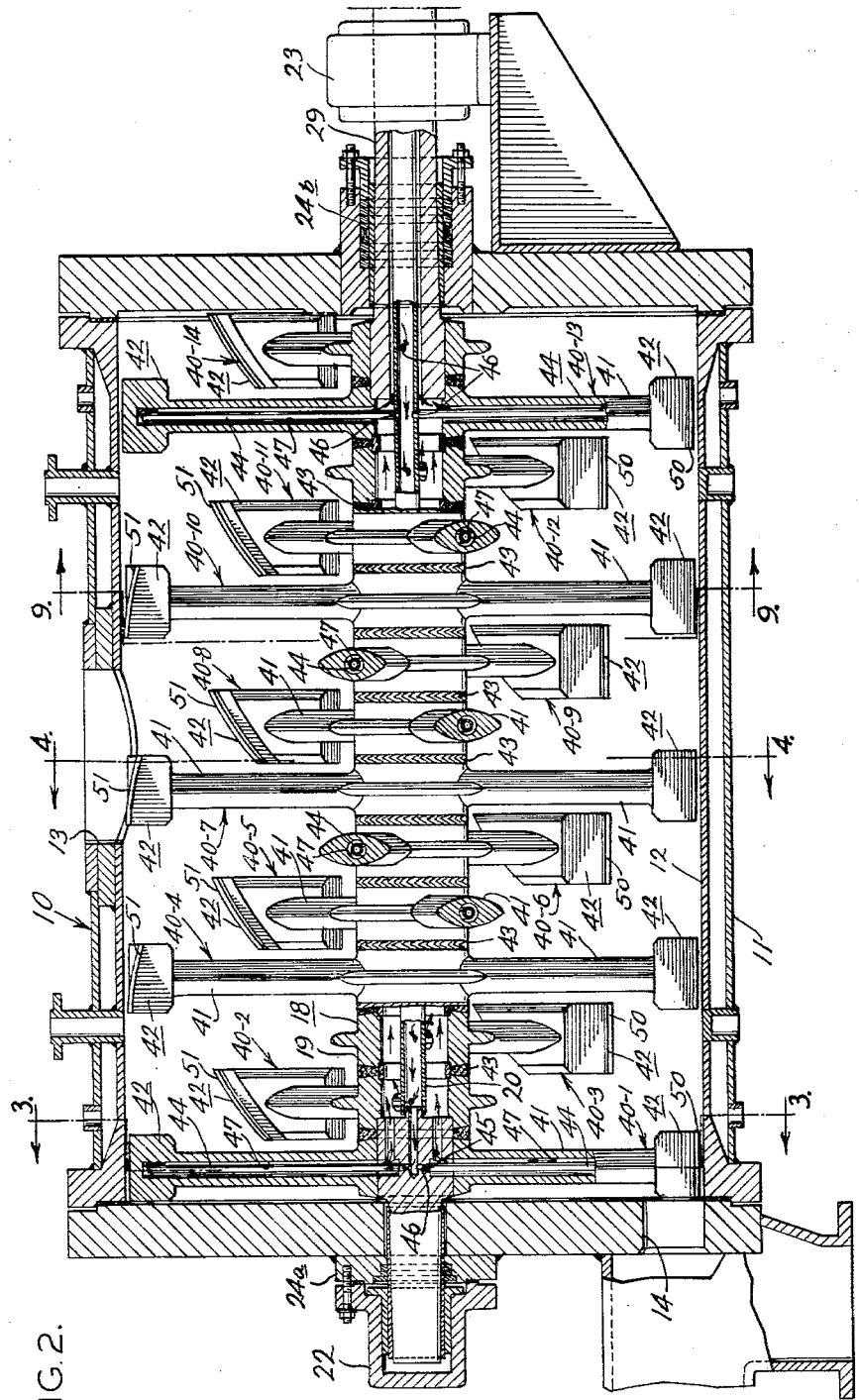
FIG. 2 is an enlarged fragmentary sectional view of a portion of the apparatus illustrated in FIG. 1.

Referring now to the drawings, and especially FIGS. 1-3, a longitudinally extending heat exchanger-mixer 10 includes a trough or jacketed casing 11, the inner surface 12 of which is preferably cylindrical and extends the entire length of the apparatus. A charging inlet 13 is provided at the upper portion of the casing 11, and a discharge outlet 14 is provided at one end of the apparatus, preferably in the lower portion of the trough when the device is mounted with its axis horizontal. The charging inlet and discharging outlet 13 and 14 respectively may be connected to conduits or other structure for bringing material to be treated to the heat exchanger-mixer 10 and for conveying it therefrom following the mixing and heat exchange process.

Rotatably mounted within the heat exchanger-mixer 10 is a double hollow shaft 18 comprising an outer shaft 19 and, in the present instance, coaxially mounted therein an inner shaft 20. The construction of the outer shaft 19 will be more fully described hereinafter. As illustrated in FIGS. 1 and 2, the double hollow shaft 18 is supported at one end by a conventional sleeve bearing 22 and at the other end by a thrust and radial bearing 23. Conventional packing glands 24a and 24b seal the double hollow shaft 18 and prevent leakage to or from the interior of the casing 11. Outboard of the support bearing 23 is a drive means 32 comprising, in the present instance, a reversible motor and reduction gears 33 and 34 respectively, connected to a coupling 35 which couples to an extension 38 of the shaft assembly 18, thus providing rotation of the double shaft assembly during operation. Outboard of the drive means 32 is a rotary coupling 25, provided for fluid communication with the hollow interior of shafts 19 and 20. To this end, the interior shaft 20 projects through the reduction gears 34 and into the housing 26 of the rotary coupling 25. The housing 26 is connected to a conduit 21 for supplying, in the present instance, a heat transfer fluid to the interior of the shaft 20. The shaft 19 is coupled to an extension 29 which connects the annular space between the shafts 19 and 20 with the interior of the housing 25, and thereafter with an exterior conduit 27 for discharging the heat transfer fluid.

In accordance with the invention, a plurality of heat transfer assemblies 40, arranged in groups 40–1 through 40–14 (see FIG. 2), are disposed at intervals along the double hollow shaft assembly 18 and spaced circumferentially therearound to form a mixing and a conveying unit. Each of the heat transfer assemblies 40 comprises a hollow radially extending blade 41, at least some of which have a shoe 42 at their radial extremity, which shoe when moving circumferentially in one direction, mixes material being treated in the heat exchanger-mixer 10, and when moving circumferentially in the opposite direction causes longitudinal advancement of the material being treated towards the discharge outlet 14. It should be noted that in the present instance the roots of the blades 41 are welded together to form the outer shaft 19, the roots of adjacent blades being connected by means of welded rings 43 or the like. Each assembly 40 also includes a quill shaft 44 adapted for connection at its inner end, in the present instance, a threaded end 45, to an opening 46 in the side wall of the inner hollow shaft 20. A large opening 47 in each blade 41, extends into the shoe 42. The opening 47 is aligned with the quill shaft opening 46, and allows the quill shaft 44 to extend radially of the shaft assembly 18 to fit, in the present instance, coaxially with its associated blade. As best illustrated in FIGS. 2 and 3, the quill shafts 44 have an external diameter somewhat less than the internal diameter of the hollow blade 41 thus forming an annular space therearound permitting fluid communication between the blade 41 and the shaft 19. Although heat exchange fluid flow is as illustrated by the arrows in FIGS. 1, 2, and 6 i.e. through the inner shaft 20, the quill shafts 44, the hollow blades 41 and then through the shaft 19, the fluid flow could just as well be reversed.

Referring now to FIGS. 5–8, the shoe 42 includes a plow 50 at the leading edge of the shoe and a material conveyor 51 at the trailing portion of the shoe. In the present instance the plow comprises a hardened steel edge 50a for sweeping adjacent the inner surface 12 of the casing 11, and a radially extending inwardly sloped face portion 50b for displacing inwardly the material adjacent the inner surface upon rotation of the shaft assembly 18 (see FIGS. 5–8). In the present instance the plow 50 has an effective mixing surface substantially parallel with the axis of the shaft assembly 18 so that upon rotation of the shaft assembly, as illustrated in FIGS. 3 and 4 in the clockwise direction, thorough mixing of the material to be treated in the heat exchanger-mixer 10 occurs without longitudinal advancement of the material. The material conveyor 51 at the trailing portion of the shoe 42 is skewed or angulated with respect to the axis of the shaft assembly, and like the plow section is adapted to sweep the inner surface 12 of the casing 11 upon rotation of the shaft assembly, except in the opposite direction. The angular setting of the conveyor is such that upon rotation, as illustrated in FIGS. 3 and 4 in a counter-clockwise direction, the material being treated will advance at a predetermined rate towards the discharge outlet 14 of the heat exchanger-mixer 10.

Figure 9:
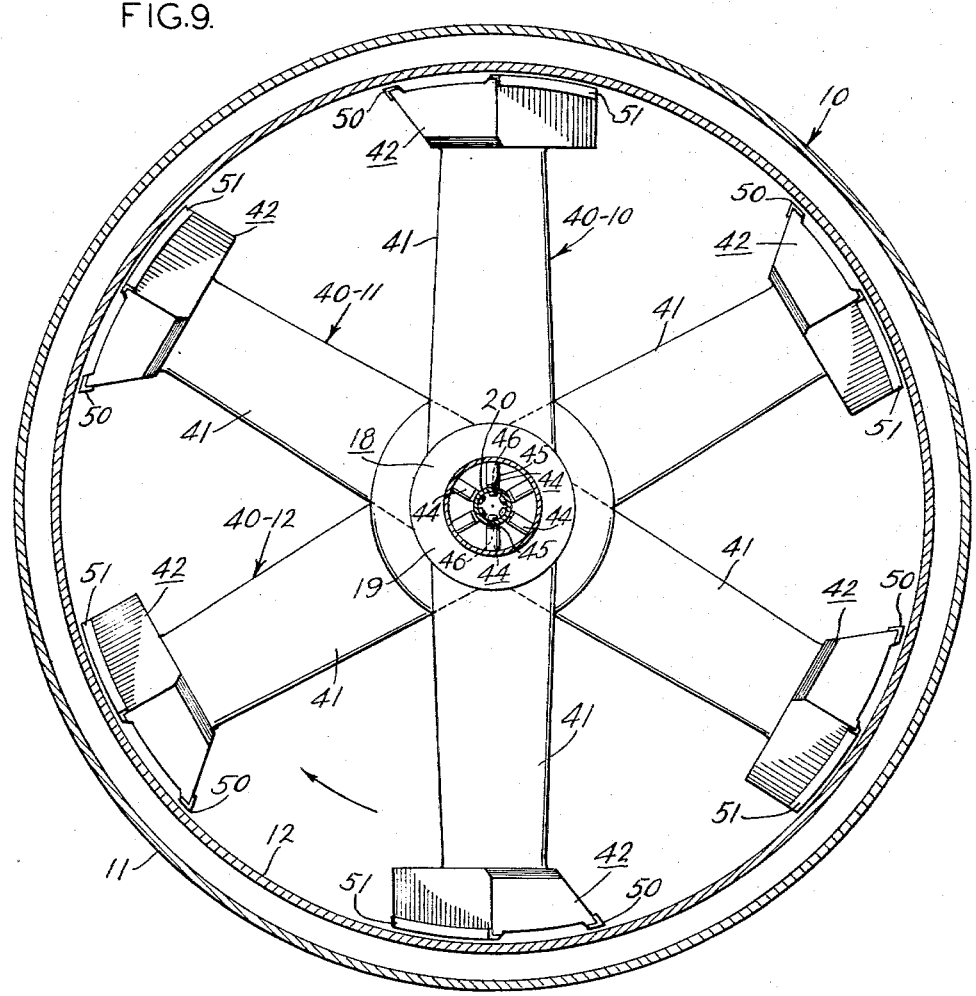
FIG. 9 is an enlarged fragmentary sectional view taken along line 9—9 of FIG. 2.
Figure 10:
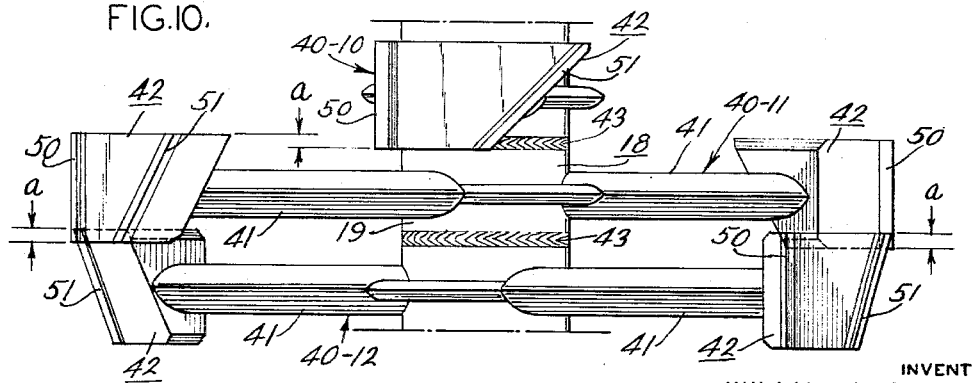
FIG. 10 is a plan view of the apparatus illustrated in FIG. 9 with a portion removed to more clearly illustrate the apparatus embodying the present invention.

As previously explained and as illustrated in FIGS. 2, 3, and 9, the heat transfer assemblies 40 are arranged in groups along the shaft assembly 18 to form the mixing and conveying apparatus. As illustrated in FIG. 3 there are four equally spaced assemblies in the group 40–1 on the shaft assembly 18, adjacent the discharge outlet 14. Thereafter the remaining groups comprise two assemblies each, 180° apart on the shaft. The circumferential disposition of each group, with respect to the first group 40–1, is angularly set, in the present instance, at 60° (see FIGS. 2 and 9). While the assemblies 40 are angularly spaced circumferentially, the shoes 42 overlap axially or longitudinally of the shaft assembly 18, so that as the shaft assembly 18 is rotated, the sweeping of the inner cylindrical surface 12 is complete. This axial overlap is illustrated in FIG. 10, the overlap being designated a for clarification. This insures complete mixing and conveying, depending upon the direction of rotation of the shaft assembly 18.

In certain instances, where the material to be treated is particularly stiff and/or has a tendency to cause build-up along the inner cylindrical surface of the heat exchanger-mixer, the plow edge of the shoes may wear quickly preventing adequate removal of the material from the surface, and thus impeding heat transfer across the wall of the casing. In order to prevent material build-up along the inner surface of the mixer, it is desirable to provide readily adjustable plows on the shoes of the heat transfer assembly.

Figure 11:
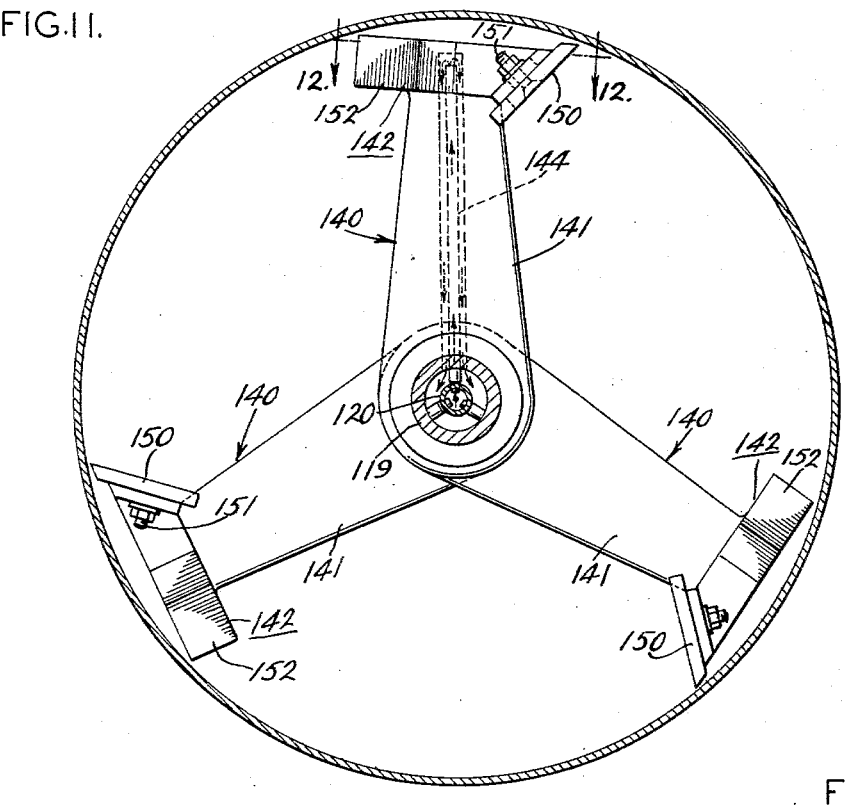
FIG. 11 is a transverse sectional view of another embodiment of the present invention.
Figure 12:
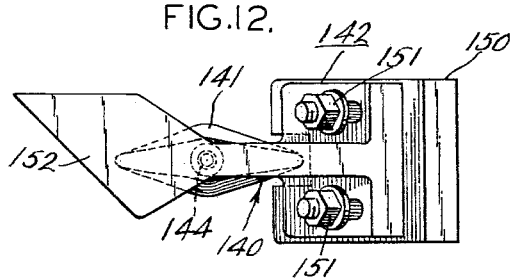
FIG. 12 is a plan view of a portion of the apparatus illustrated in FIG. 11 and taken along line 12—12 of FIG. 11.
Figure 13:
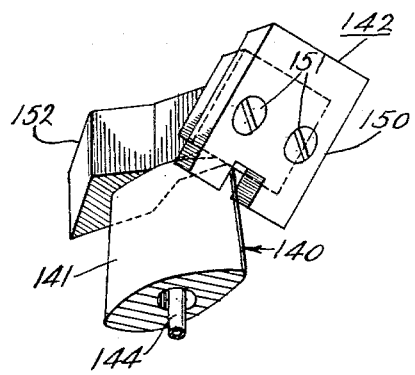
FIG. 13 is a perspective view of that portion of the apparatus illustrated in FIG. 12.

To this end, and as illustrated in FIG. 11, a plurality of heat transfer assemblies 140 is therein illustrated including radially extending blades 141 and at the extended terminus of the blades, shoes 142. Similar to the embodiment of the invention illustrated in FIGS. 1–10, the blades 141 and shoes 142 are hollow and adapted to receive therein a quill shaft 144 which communicates with a hollow inner shaft 120 coaxially mounted with respect to an outer shaft 119 upon which the blades 141 are mounted. As illustrated in FIGS. 12 and 13, a plow 150 is adjustably mounted by fastening means 151 on each shoe 142 of the heat transfer assembly. Thus the plow 150 may be adjusted to compensate for wear by simply loosening the fastening means 151, in the present instance comprising a pair of nuts and bolts, moving the fastening means to a new position, and then tightening the fastening means. Also, similar to the previously discussed embodiment of the invention, each shoe 142 also mounts at its trailing edge a skewed or angulated conveyor portion 152.

As may be noted in the drawings and in order to optimize heat transfer, the heat transfer fluid is in parallel flow through the assemblies rather than concurrent or counter-current flow. This permits the maintenance of a uniform temperature in the heat transfer assemblies, which thus affords the greatest mean-temperature-difference between the material being processed and the heat transfer fluid. The heat transfer due to the mean-temperature-difference thereby becomes dependent only upon the volumetric flow of the heat transfer fluid.

The use to which equipment constructed in accordance with the present invention may be put is batch processing of materials wherein the materials must be treated by either adding or removing heat during the process. Such processes include calcination, chilling, cooking, crystallizing, indirect drying, heating, reactions of various kinds, and/or solvent recovery. The materials which may be processed in equipment constructed in accordance with the present invention include liquids, slurries, paste materials, and/or solids. An example of the use of this equipment would be where reactants are added to the mixer which reactants react upon mixing providing either an endothermic or exothermic reaction with the heat being added or removed respectively through the heat transfer assemblies or, if the heat exchanger is jacketed, also through the mixer walls.

In summary, apparatus such as heretofore described and constructed in accordance with the present invention will permit mixing of material added to while also permitting heat to be indirectly transferred either to or from the processed material. Further the present invention provides increased utilization of heat transfer surfaces permitting faster and more economical processing.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A heat exchanger-mixer for indirectly treating material comprising an elongated trough having an inlet for charging the trough with material to be treated and an outlet for discharging treated material from said trough, a double hollow shaft assembly comprising a hollow shaft extending longitudinally of said trough and rotatably supported therein, another hollow shaft mounted within said first shaft to define an annular space between said shafts, a plurality of heat transfer assemblies each comprising a radially extending hollow blade connected to one of said shafts and in communication with the interior thereof, and a hollow quill shaft extending into said hollow blade, connected to the other of said shafts and in communication with the interior thereof, said heat transfer assemblies providing thereby parallel heat transfer fluid paths connecting the interiors of said shafts through said assemblies, a shoe mounted on the radial extremity of at least some of said blades, each of said shoes having a plow with a radially extending inwardly sloping face portion connected on the leading portion of said shoe to mix the material when said shaft assembly is rotated in one direction and having a conveyor on the trailing portion thereof to cause said material to advance towards said discharge outlet upon rotation of said shaft in the opposite direction.

2. A heat exchanger-mixer in accordance with claim 1 wherein said shoes have a hollow portion coextensive with the hollow interior of said blade so as to permit fluid communication with the interior thereof.

3. A heat exchanger-mixer in accordance with claim 1 wherein said heat transfer assemblies are angularly spaced circumferentially of said shaft assembly and wherein said shoes of at least some of said assemblies overlap axially of said shaft assembly.

4. A heat exchanger-mixer in accordance with claim 1 wherein said heat transfer assemblies are arranged in groups disposed at intervals along said shaft assembly, and said heat transfer assemblies are disposed circumferentially of said shaft assembly.

5. A heat exchanger-mixer in accordance with claim 1 wherein the interior lower portion of said trough is semi-circular in cross section and wherein said plow includes an edge substantially axially disposed for sweeping adjacent at least the semi-circular portion of said inner surface of said trough, said plow having an effective mixing surface substantially parallel with the axis of said shaft assembly.

6. A heat exchanger-mixer in accordance with claim 5 wherein said conveyor includes a skewed portion angularly set with respect to said shaft assembly so as to sweep said semi-circular portion of said trough upon rotation in said opposite direction.

7. A heat exchanger-mixer in accordance with claim 5 wherein said inwardly sloped face portion of said plow is adjustably fixed to said shoe by a fastening means whereby wear in the radial portion of said plow is compensated.

8. A heat exchanger-mixer in accordance with claim 5 wherein said blades each include a root portion and said exterior one of said shafts has at least a portion thereof constructed of said root portions.

9. A heat exchanger-mixer for indirectly treating material comprising an elongated trough having an inlet for charging the trough with material to be treated and an outlet for discharging treated material from said trough, a double hollow shaft assembly comprising a hollow shaft extending longitudinally of said trough and rotatably supported therein, another hollow shaft mounted within said first shaft to define an annular space between said shafts, a plurality of heat transfer assemblies each comprising a radially extending hollow blade connected to the outer one of said shafts and in communication with the interior thereof, and a hollow quill shaft extending into said hollow blade, connected to the other of said shafts and in communication with the interior thereof, said heat transfer assemblies providing thereby parallel heat transfer fluid paths connecting the interiors of said shafts through said assemblies, a shoe mounted on the radial extremity of at least some of said blades, each of said shoes having a plow on the leading portion thereof to mix the material when said shaft assembly is rotated in one direction without advancing the material longitudinally of the trough to said discharge outlet and having a conveyor on the trailing portion thereof to cause said material to advance towards said discharge outlet upon rotation of said shaft in the opposite direction, said heat transfer assemblies being angularly spaced circumferentially of said shaft assembly and said shoes of at least some of said assemblies being dimensioned so as to overlap one another axially of said shaft assembly.

10. A heat exchanger-mixer in accordance with claim 9 wherein said shoes have a hollow portion coextensive with the hollow interior of said blade so as to permit fluid communication with the interior thereof.

11. A heat exchanger-mixer in accordance with claim 9 wherein said heat transfer assemblies are arranged in groups disposed at intervals along said shaft asesmbly, at least one of said groups having at least four equally spaced heat transfer assemblies.

12. A heat exchanger-mixer in accordance with claim 9 wherein the interior lower portion of said trough is semi-circular in cross section and wherein said plow includes an edge substantially axially disposed for sweeping adjacent at least the semi-circular portion of said inner surface of said trough, said plow having an effective mixing surface substantially parallel with the axis of said shaft assembly.

13. A heat exchanger-mixer in accordance with claim 12 wherein said conveyor includes a skewed portion angularly set with respect to said shaft assembly so as to sweep said semi-circular portion of said trough upon rotation in said opposite direction.

14. A heat exchanger-mixer in accordance with claim 12 wherein said effective mixing surface of said plow includes a radially extending inwardly sloped face portion connected on the leading portion of said shoe for displacing inwardly the material adjacent said inner surface.

15. A heat exchanger-mixer in accordance with claim 14 wherein said inwardly sloped face portion is adjustably fixed to said shoe by a fastening means whereby radial wear in said plow may be compensated.

16. A heat exchanger-mixer in accordance with claim 12 wherein said blades each include a root portion and said exterior one of said shafts has at least a portion thereof constructed of said root portions.

17. A heat exchanger-mixer for indirectly treating material comprising an elongated trough having an interior surface, the lower portion of which is substantially semi-circular in cross section, an inlet for charging the trough with material to be treated and an outlet for discharging treated material from said trough, a double hollow shaft assembly comprising a hollow shaft extending longitudinally of said trough and rotatably supported therein, another hollow shaft mounted within said first shaft to define an annular space between said shafts, a plurality of heat transfer assemblies each comprising a radially extending hollow blade connected to the outer one of said shafts and in communication with the interior thereof, and a hollow quill shaft extending into said hollow blade, connected to the other of said shafts and in communication with the interior thereof, said heat transfer assemblies providing thereby parallel heat transfer fluid paths connecting the interiors of said shafts through said assemblies, a shoe mounted on the radial extremity of at least some of said blades and each shoe having a hollow portion coextensive with the interior of said blade, each of said shoes having a plow on the leading portion thereof to mix the material when said shaft assembly is rotated in one direction and having a conveyor on the trailing portion thereof to cause said material to advance towards said discharge outlet upon rotation of said shaft in the opposite direction, said heat transfer assemblies being angularly spaced circumferentially of said shaft assembly and said shoes of at least some of said assemblies being dimensioned so as to overlap axially of said shaft assembly, said plow including an edge substantially axially disposed for sweeping adjacent at least the semi-circular portion of said inner surface of said trough, said plow having an effective mixing surface substantially parallel with the axis of said shaft assembly and including an inwardly sloped portion for displacing inwardly the material adjacent said inner surface.

References Cited by the Examiner

UNITED STATES PATENTS

| 1,982,817 | 12/1934 | Leach et al. | 259—169 |
| 3,020,025 | 2/1962 | O'Mara | 259—109 |

WALTER A. SCHEEL, *Primary Examiner.*

ROBERT W. JENKINS, *Assistant Examiner.*